Figure 6:
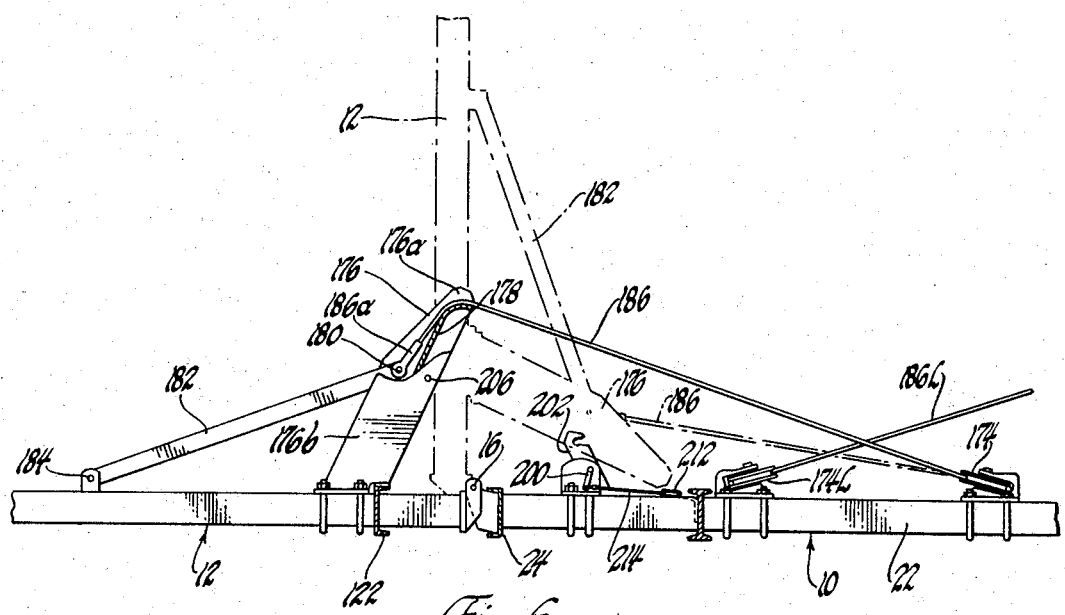

Jan. 9, 1968
W. H. TWIDALE
3,362,483
EARTH WORKING IMPLEMENT
Filed Sept. 14, 1964
4 Sheets-Sheet 1
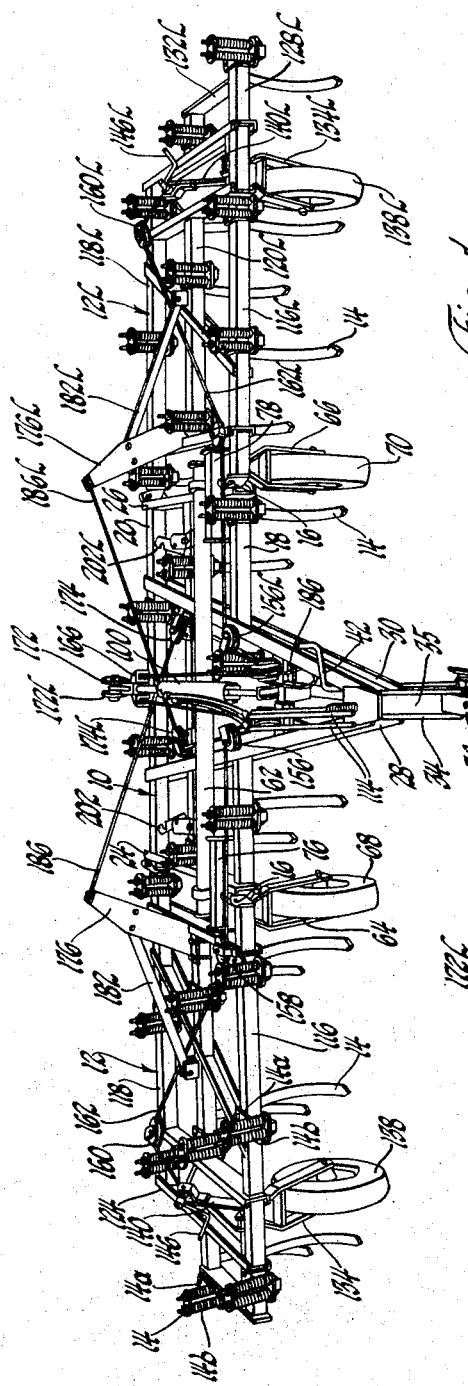
INVENTOR
WILLIAM H. TWIDALE
BY Tweedale & Gerhardt
ATTORNEYS.

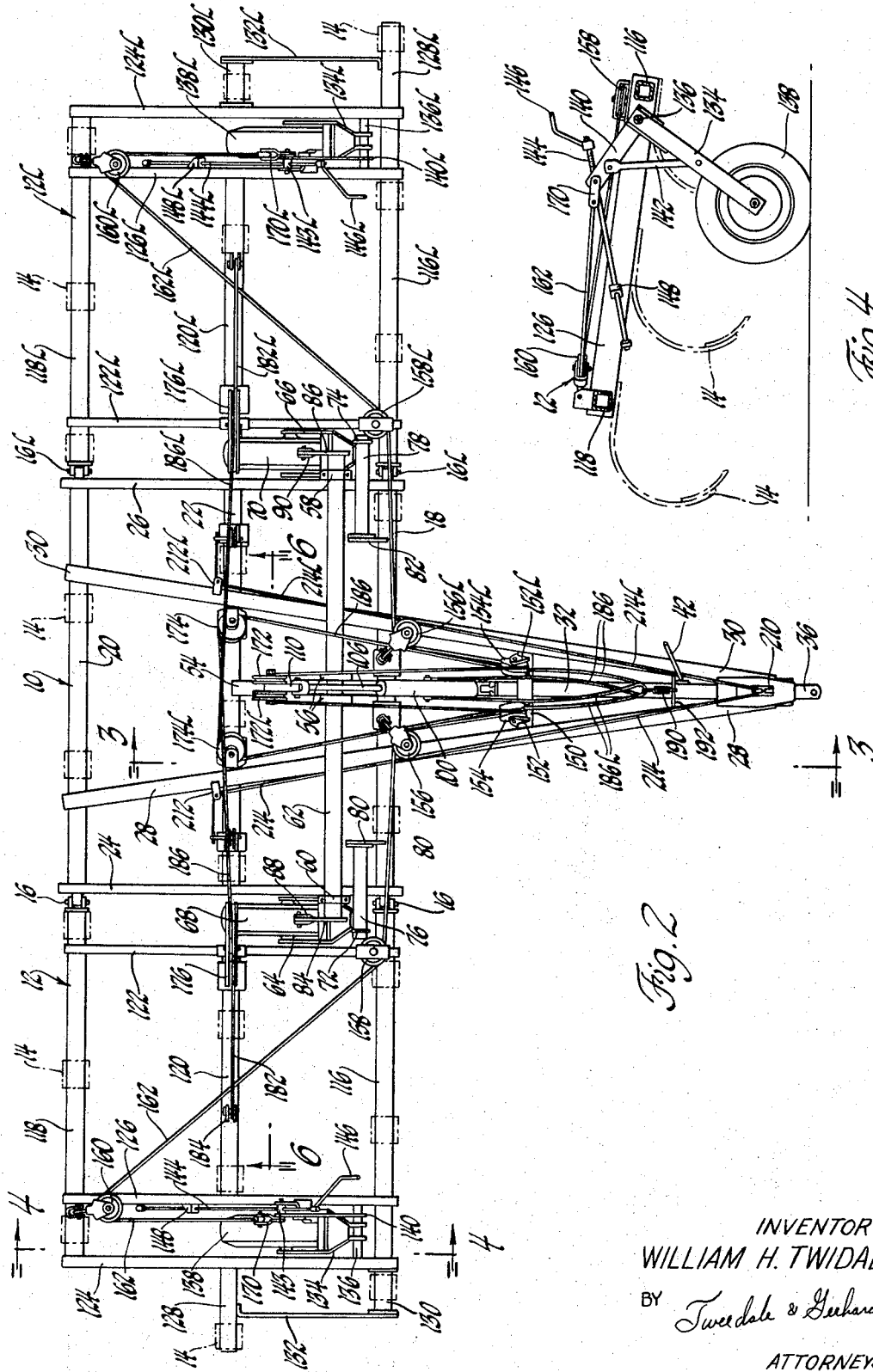

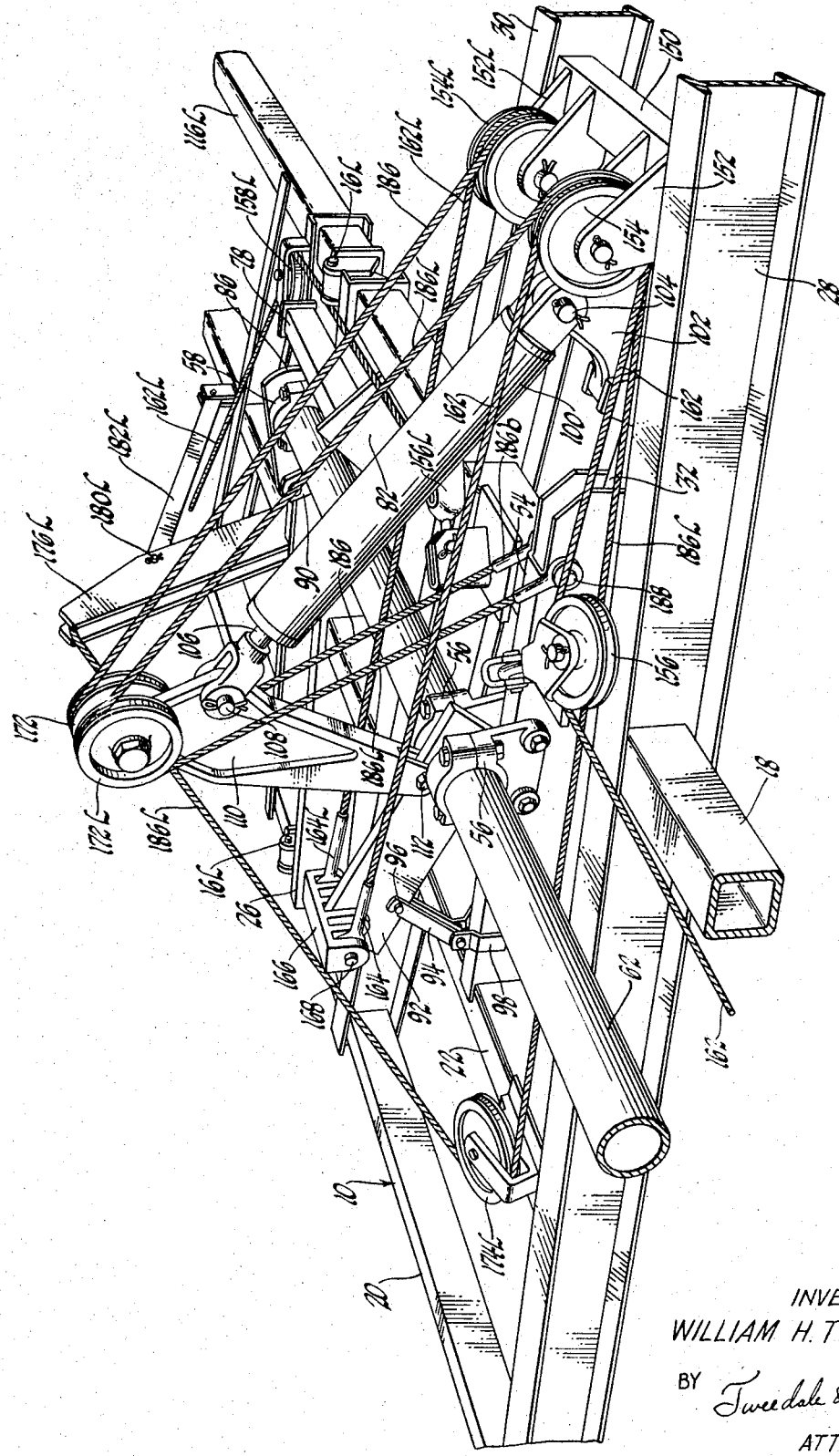

Jan. 9, 1968     W. H. TWIDALE     3,362,483
EARTH WORKING IMPLEMENT

Filed Sept. 14, 1964     4 Sheets-Sheet 4

INVENTOR
WILLIAM H. TWIDALE
BY Tweedale & Gerhardt
ATTORNEYS.

United States Patent Office 3,362,483
Patented Jan. 9, 1968

3,362,483
EARTH WORKING IMPLEMENT
William H. Twidale, Islington, Ontario, Canada, assignor to Massey-Ferguson Limited, Toronto, Ontario, Canada
Filed Sept. 14, 1964, Ser. No. 395,995
9 Claims. (Cl. 172—311)

This invention relates generally to earth working implements and more particularly to multiple section implements for carrying a large number of cultivators, harrows, or other earth working tools.

Due to the increase in size and power of tractors, it is now possible for a single tractor to pull a large number of cultivating tools to either increase the swath made by each pass of the tractor, or to perform multiple operations on the soil by connecting sets of different type tools in tandem with each other behind the tractor. The depth of penetration of the cultivating tools is generally controlled by raising and lowering ground engaging wheels by means of a hydraulic ram. For maximum penetration, the wheels are raised relative to the implement permitting the full weight of the implement to act on the cultivating tools. Intermediate working depths are obtained by actuation of the hydraulic ram, and for transport, the wheels are lowered to their maximum position to raise the tools out of engagement with the ground.

The size of the implements are increased generally by adding sections to the implement frame which must be either removed or raised to a transport position in order to meet road conditions and permit the implement to pass through gates and narrow passages. With presently available implements of this type, the auxiliary sections are usually raised or lowered manually or by a means of a complex system independently of the main implement frame depth controlling system.

An object of this invention is to provide a tool carrying implement having one or more auxiliary sections which can be moved between extended working positions and retracted transport positions by means of the power equipment normally utilized only for depth control.

A further object is to provide a sectional tool carrying implement having an improved arrangement for controlling the working depth of the tools carried by each section of the implement.

Another object lies in the provision of a sectional implement frame for supporting earth working tools that is flexible and reliable in operation, structurally efficient, and economical to manufactrue.

In carrying out the foregoing objects, an implement embodying the invention includes a main frame section having ground engaging wheels supported on a turnable rockshaft carried by the main frame section. Rotation of the rockshaft is obtained by means of a rocker arm to raise and lower the wheels relative to the implement. Actuation of the rocker arm to position the wheels between their transport and working positions is obtained by means of a hydraulic ram adapted to be connected with the hydraulic system of the tractor. One end of the ram is pivotally mounted on the main frame section and the other end is pivotally connected with a force transmitting lever mounted on the main frame section for pivotal movement in the plane of the rocker arm. By extending the hydraulic ram, the force transmitting lever will engage the rocker arm and maintain the wheels in the desired position. However, the force transmitting lever can rotate about its axis of rotation independently of the rocker arm such that the wheels can be locked in position releasing the ram for independent operation to perform other functions. Consequently, auxiliary frame sections are attached to the main frame and can be raised and lowered by a removable chain and pulley arrangement with the wheels of the main frame section in their transport position.

Figure 7:
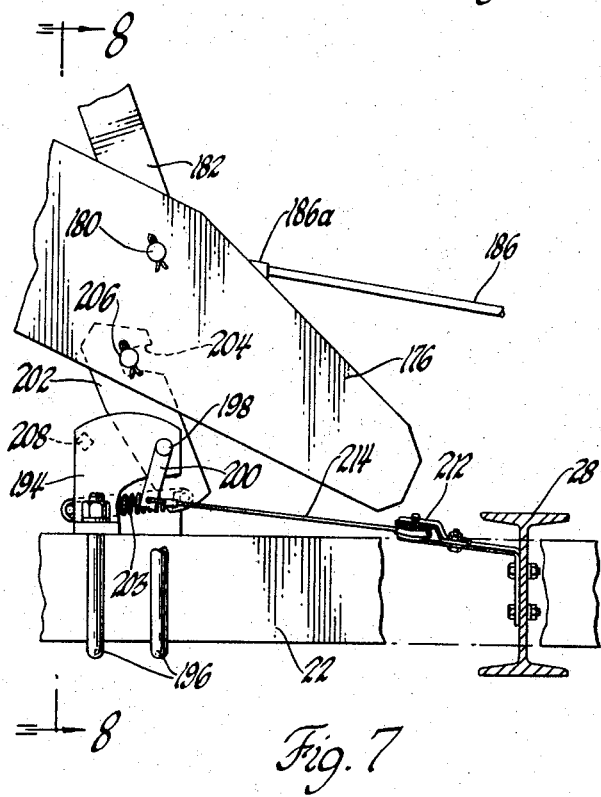
Figure 8:
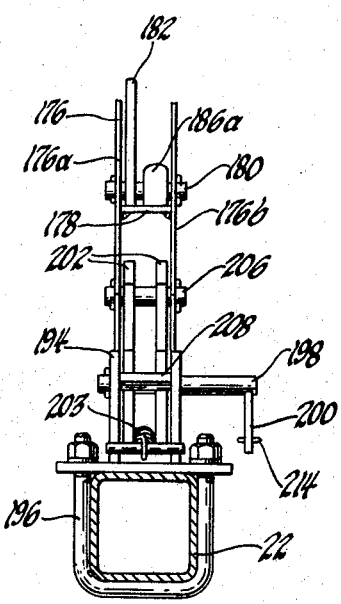

Other objects and advantages of the invention will become apparent from the following description taken in connection with the accompanying drawings in which:

FIG. 1 is a perspective view of an implement embodying the invention in its preferred form;
FIG. 2 is a plan view of the implement of FIG. 1;
FIG. 3 is a sectional view taken on lines 3—3 of FIG. 2;
FIG. 4 is a sectional view taken on lines 4—4 of FIG. 2;
FIG. 5 is an enlarged perspective view of the depth control and lift system of the implement;
FIG. 6 is a sectional view taken on lines 6—6 of FIG. 2;
FIG. 7 is an enlarged detail of the transport latch for the auxiliary frame section; and
FIG. 8 is a sectional view taken on lines 8—8 of FIG. 7.

While the invention will be described in connection with a specific embodiment, it should be understood that the invention is not limited to the precise construction shown, but that alterations and modifications in the construction and arrangement of the various parts and substitution of equivalents can be made without departing from the scope and spirit of the invention.

With reference primarily to FIGS. 1 and 2, an implement embodying the present invention includes a frame 10 which may also be referred to as the center or main frame section when necessary to distinguish it from the auxiliary sections described below. Secured to the sides of main frame section 10 is a pair of auxiliary frame sections designated generally by reference numerals 12 and 12L. Since auxiliary frame sections 12 and 12L are identical in construction except for section 12 being mounted at the right of section 10 (as viewed from the rear of the implement), and section 12L being mounted at the left of section 10, only section 12 will be described in detail. Corresponding parts on section 12L and its associated control elements will be identified by the same reference numerals as on section 12 followed by the subscript letter L.

Supported on frame sections 10, 12 and 12L are a plurality of earth working tools 14 fixed to the various frame members by clamps 14a having cushioning springs 14b. Tools 14 are omitted from the remaining figures of the drawings for clarity of illustration. It is apparent that tools other than the type shown may be supported on the frame sections, and that the invention is not limited to any particular type of earth working tool.

Auxiliary sections 12 and 12L are hinged to the sides of main frame section 10 by means of hinge pins 16 and 16L, respectively. Consequently, the auxiliary frame sections can swing upwardly about the hinge pins for transport and storage in a manner to be set forth in detail presently.

Main frame section 10 includes a front frame member 18, a rear frame member 20, and a central frame member 22 disposed between and parallel to front and rear frame members 18 and 20, respectively. Frame members 18, 20 and 22 are secured together at their ends by side frame members 24 and 26. Extending forwardly from rear frame member 20 are converging hitch frame members 28 and 30, and a hitch member 34 formed with a vertical groove 35 is mounted at the forward ends of the converging members 28 and 30. Extending forwardly and downwardly from front frame member 18 is a hitch frame member 32 (FIG. 3) which is secured to member 34 and to members 28 and 30 by means of vertical plate members 40.

Mounted in groove 35 of hitch member 34 is a clevis 36 for attaching the implement to the drawbar 38 of a tractor or similar towing vehicle (FIG. 3). The position of clevis 36 in groove 35 may be selectively adjusted by means of the vertically disposed series of holes 34a in member 34.

A jack screw 42 is threadedly mounted in a suitable bracket on hitch frame member 30 for supporting the front end of the implement when it is not in use. Pivotally mounted on the lower end of jack screw 42 is a support plate 44, and a stabilizing bar or strut 46 has its lower end pivoted to support plate 44, and its upper end pivoted at 48 to a bracket 50 secured by U-bolts 52 to hitch frame member 32.

As best shown in FIGS. 2, 3 and 5, a beam or frame member 54 is supported between frame members 18 and 22 and extends in a fore and aft direction parallel to side frame members 24 and 26. Mounted on each side of member 54 intermediate its ends is a pair of bearing members 56. Similar bearing members 58 and 60 are mounted, respectively, on side frame members 26 and 24 in axial alignment with bearing members 56. A transverse rockshaft 62 is journalled for rotation in the bearing members 56, 58 and 60.

A pair of forks 64 and 66 are pivoted on the main frame section 10 for carrying wheels 68 and 70, respectively. The forks 64 and 66 are pivotally mounted in brackets 72 and 74 carried at the ends of support bars 76 and 78, respectively (FIGS. 1 and 5). The bars 76 and 78 are secured to front frame member 18 by means of plates 80 and 82 and project laterally across side frame members 24 and 26 to which they are also secured as by welding or other suitable means.

Secured to the ends of rockshaft 62 are crank arms 84 and 86 which are connected with forks 64 and 66, respectively, by means of links 88 and 90, respectively. Thus, by rotating rockshaft 62 about its longitudinal axis, crank arms 86 cause forks 66 to swing about pivots 66a (FIG. 3) to raise and lower wheels 68 and 70 relative to the implement frame.

A rocker arm 92 is keyed, welded, or otherwise non-rotatably secured to rockshaft 62 between the bearings 56 for rotating rockshaft 62 to raise and lower wheels 68 and 70. As shown in FIGS. 3 and 5, counter-clockwise rotation of rocker arm 92 tends to move wheels 68 and 70 downwardly with respect to the frame to raise the implement relative to the ground, and conversely, clockwise rotation of rocker arm 92 raises wheels 68 and 70 relative to the implement to in turn lower the implement relative to the ground.

In the full-line position of wheels 70 in FIG. 3, rocker arm 92 is in the transport position in which the earth working tools carried by the implement are raised above the ground. Wheels 70, in the transport position, are in their extreme lower position relative to frame 10. For transport, rocker arm 92 may be locked in the position shown in FIG. 3 by means of a link 94 pivotally mounted to a bracket 98 secured to member 54. The link 94 is slotted at its upper end to engage a pin 96 carried by rocker arm 92 near its free end.

The elevating and depth control means for controlling the position of wheels 68 and 70, as well as for controlling the position of the auxiliary frame sections, includes an expansible power element in the form of a hydraulic ram 100, the cylinder of which is pivotally connected by a pin 104 to a bracket 102 secured to hitch frame member 32. The piston rod 106 of ram 100 is pivotally connected by a pin 108 with a force transmitting lever 110 pivotally supported on rocker arm 92 by a pin 112 (FIG. 5). The pivotal axis of force transmitting lever 110 at pin 112 is located near the axis of rotation of rocker arm 92. The hydraulic ram 100 may be connected with the hydraulic system of the tractor by a hydraulic line 114 shown in FIG. 1 but omitted from the remaining views for clarity.

With reference primarily to FIG. 2, auxiliary frame section 12 includes transverse front, rear and intermediate frame members 116, 118 and 120, respectively. The front and rear frame members 116 and 118 are secured together at their ends by side frame members 122 and 124, and intermediate frame member 120 has its outer end secured to a longitudinal intermediate frame member 126 intermediate its ends. Projecting outwardly from side frame member 124 are extensions 128 and 130 for supporting additional soil working tools 14. The extensions 128 and 130 are braced by a plate member 132.

Pivotally mounted on a shaft 136 that extends between frame members 124 and 126 is a fork 134 which carries a ground engaging support member or wheel 138. As seen in FIG. 4, a crank arm 140 is non-rotatably fixed to shaft 136 and is connected with fork 134 through a link 142. Rotation of the crank 140 about the axis of shaft 136 in a counter-clockwise direction in FIG. 4 tends to lower the wheel 138 relative to frame 12, and clockwise movement tends to raise the wheel 138 relative to frame 12. Rotatably mounted on crank arm 140 near its free end is an internally threaded fitting 143 (FIG. 2) in which is threadedly mounted one end of an adjustment rod 144. The opposite end of rod 144 is slidably received in an apertured fitting 148 rotatably mounted on frame member 126. Rod 144 is provided with a crank handle 146 for adjusting the position of the rod relative to fitting 143.

A support member 150 for a pair of pulley support brackets 152 and 152L is mounted transversely between the hitch frame members 28 and 30 (FIGS. 2 and 5). Rotatably supported in the brackets 152 and 152L are a pair of double pulleys or sheaves 154 and 154L, respectively. Mounted on the frame members 18, 116 and 118, respectively, are pulleys 156, 158 and 160. The pulleys 154, 156, 158 and 160 carry a flexible cable 162 having an eyelet anchoring member 164 connected to a yoke bracket 166 mounted on the end of the rocker arm 92 by a pin 168 (FIG. 5). The cable 162 has its other end anchored to a bracket 170 secured to the free end of crank arm 140 (FIG. 4).

With the auxiliary frames in their extended, coplanar position with respect to main frame 10, the working depth of the implement is controlled by means of the hydraulic ram 100. To place the implement in operation, latch link 94 is released from pin 96 placing rocker arm 92 under the control of force transmitting lever 110. As seen in FIG. 3, extension or expansion of ram 100 causes the force transmitting lever 110 to pivot about pin 112 in a counter-clockwise direction in the plane of rocker arm 92 until it engages the rocker arm 92.

As shown in FIG. 3, the wheels 70 are limited in their upward movement by the engagement of rocker arm 92 with the force transmitting lever 110. The weight of the implement causes it to be lowered relative to the ground by retraction of piston rod 106 within the cylinder of ram 100 permitting the rocker arm 92 to follow lever 110 and pivot in a clockwise direction. This causes the wheels 68 and 70 to raise relative to the implement until the rocker arm 92 is stopped by force transmitting lever 110, or until the wheels 68 and 70 are raised relative to the implement to their maximum working position in which case the full weight of the implement bears on the earth working tools 14.

Rotation of the rockshaft 62 by rocker arm 92 thus sets the position of wheels 68 and 70 relative to the implement, which in turn determines the position of the implement relative to the ground and thus the depth of penetration of the earth working tools 14. Auxiliary frames 12 and 12L are maintained at the same height above the ground as frame 10 by means of the auxiliary frame depth control cable 162. Since cable 162 is anchored to the free end of rocker arm 92, the motion of rocker arm 92 is transmitted through cable 162 to crank arm 140 (FIG. 4).

When the initial position of wheels 68 and 70 has been determined, adjustment rod 144 is rotated until frames 12 and 12L are in coplanar relationship with main frame 10, assuming the ground to be level beneath the implement. Thus, due to the connection of cable 162 between the crank arm 140 and rocker arm 92, the position of wheels 138 and 130L with respect to their respective associated auxiliary frames 12 and 12L is the same as the position of wheels 68 and 70 relative to main frame 10. Consequently, the depth of penetration of the tools 14 may be made constant throughout the length of the implement. Due to the hinged connection between the auxiliary frames and main frame, the auxiliary frames can rise and fall from the coplanar with respect to the main frame to accommodate irregularities in the surface of the ground with cable 162 maintaining the proper depth of penetration of the tools.

Since the ground engaging wheels can be removed from the control of ram 100 in their transport position due to locking link 94, the ram is thus available to operate independently of the depth control system.

A pair of pulleys 172 and 172L are mounted on the upper, free end of force transmitting lever 110. A co-operating pair of pulleys 174 and 174L are mounted on frame member 22 (FIGS. 2 and 5) for supporting a lifting cable for the auxiliary frames. As shown in FIGS. 5, 6 and 8, each auxiliary frame is provided with an upright lifting arm 176 made up of a pair of spaced plates 176a and 176b joined together by a web 178 curved inwardly toward main frame 10 at its upper end. Lifting member 176 is braced by a bar 182 pivotally connected at one end to a bracket 184 on frame member 120 of auxiliary frame 12, and its other end to a pin 180 extending between plates 176a and b.

One end of a cable 186 is anchored to the pin 180 by means of an apertured eyelet 186a, and the other of cable 186 is anchored to member 54 (FIG. 5) by a pin 188 passing through an apertured eyelet 186b at the end of the cable. With all of the ground engaging wheels locked in the transport position by link 94, ram 100 can be fully retracted. Cables 186 and 186L may then be placed over pulleys 172, 172L, 154, 154L and 174 and 174L. The length of cable 186 is such that when the ram 100 is fully retracted, it can be placed onto or removed from pulley 172 and placed in storage between hitch frame members 28 and 30. A storage spring 190 having a hook for receiving cables 186 and 186L in their storage position is mounted on a support bracket 192 and maintains the cables taught to prevent them from fouling the equipment.

As seen in FIGS. 6 and 7, a bracket 194 is secured to frame member 22 of main frame section 10 by means of U-bolts 196. Pivotally mounted on the bracket 194 is a pin 198 on which is non-rotatably supported a latch release lever 200 and a latch member 202. The latch member 202 is formed with a slot 204 for engagement with a pin 206 mounted in lifting member 176. Latch member 202 is biased toward a locking position by a spring 203 and is limited in its counter-clockwise movement, as viewed in FIGS. 7, by a stop member 208. Actuation of latch 202 in a counter-clockwise direction about pin 198 to a release position is accomplished by means of a cable 214 extending around the pulley 212 on hitch frame member 28 to a lever 210 at the forward end of the hitch frame (FIG. 3).

To raise the auxiliary frames to their transport position, rocker arm 92 is locked in its transport position by means of links 94 as shown in FIG. 5. Ram 100 is then retracted to its full extent and cables 186 and 186L are placed over pulleys 172 and extend around pulleys 154 and 154L and 174 and 174L as shown in FIG. 5. Ram 100 is then extended causing the cables 186 to act through lift arm 176 to swing auxiliary frame 12 upwardly to the broken line position shown in FIG. 6. As frame 12 approaches its retracted storage position, pin 206 engages the upper edge of latching member 202 forcing it rearwardly toward its release position until slot 204 registers with the pin, whereupon spring 203 causes the latch 202 to engage pin 206 and lock lifting arm 176 in the position shown in FIG. 7. The entire implement is thus supported by wheels 68 and 70 and all tools 14 are raised above the ground.

To return the auxiliary frames to their extended, operating positions, latch release lever 210 is actuated rearwardly, or clockwise as viewed in FIG. 3, to rotate latching member 202 in a counter-clockwise direction as viewed in FIG. 7 to release pin 206. Ram 100 is then retracted permitting the frames to lower under their own weight to their extended, operative positions. Cables 186 and 186L may then be removed from pulleys 172 and 172L and stored on spring 190 during operation.

Thus, since rocker arm 92 can be removed from the control of force transmitting lever 110, the hydraulic ram can be utilized to raise and lower the auxiliary frames as well as to control the working depth of the implement. The operator is required only to position or remove the lifting cables from the force transmitting lever and the lifting and depth control operation are both controlled by the tractor hydraulic system.

It will be apparent to those skilled in the art that modification in the construction and arrangement of parts of the illustrated embodiment can be made without departing from the invention as defined in the appended claims.

I claim:

1. An implement frame for supporting earthworking tools comprising: a main frame section; a ground support means mounted on said main frame section for movement between transport and working positions relative to the main frame section to respectively raise and lower the main frame section relative to the ground; an auxiliary frame section connected with said main frame section for movement between an extended, operative position and a retracted inoperative position relative to said main frame section; a force transmitting member mounted on the main frame section for movement in a range between two positions for moving the ground support means toward its transport position when moving in one direction within said range; and permitting the ground support means to move toward its working positions when moving in the other direction within said range; extensible and retractable power means mounted between the main frame section and force transmitting member operable upon extension thereof to move the force transmitting member in said one direction, and operable upon retraction thereof to move the force transmitting member in said other direction; means for locking said ground support means in its transport position and for permitting independent retraction and extension of said power means; and motion transmitting means connected with said auxiliary frame section and selectively cooperable with said force transmitting member when operating through at least a portion of said range for retracting and extending the auxiliary frame section upon extension and retraction, respectively, of said power means.

2. An implement frame as defined in claim 1 wherein said auxiliary frame section is connected to said main frame section for pivotal movement between its extended and retracted position, and further including lift means projecting from the auxiliary frame section, a pulley carried by said force transmitting member, and at least one pulley mounted on said main frame section, wherein said motion transmitting means comprises a flexible cable having one end anchored to said lift means and its other end anchored to the main frame section and of a length to be selectively engageable with said main frame pulley and the pulley on the force transmitting member intermediate the cable ends when the power means is retracted and such that one way of said power member causes the cable to swing said auxiliary section to its retracted position.

3. An implement frame as defined in claim 2 further including latch means on the main frame section engageable by said lift means as the auxiliary frame moves to its retracted position for locking the auxiliary frame against movement from the retracted position.

4. An implement frame as defined in claim 3 further including a hitch frame extending forwardly from the main frame section, a latch release lever pivotally mounted on said hitch frame, and flexible means connecting said latch release lever with said latch means for selectively releasing said latch means permitting the auxiliary frame to return to the extended position.

5. An implement frame for supporting a plurality of earthworking tools including: a main frame section; a rockshaft journalled on said main frame section; a ground support member secured to said rockshaft for movement relative to said main frame section upon rotation of said rockshaft between transport and working positions to respectively raise and lower the main frame section relative to the ground; a rocker arm secured to the rockshaft and movable between a first position when the ground support member is in its extreme working position to place the main frame section in its lowermost position relative to the ground, and a second position when the ground support member is in its transport position to raise the main frame section to its maximum height above the ground; a force transmitting lever mounted on the main frame section for pivotal movement in the plane of said rocker arm; extensible and retractable power means mounted between the main frame section and said force transmitting lever operable upon extension thereof to pivot the force transmitting lever into engagement with the rocker arm to move the rocker arm from its first position toward its second position, and operable upon retraction thereof to pivot the force transmitting lever in the opposite direction permitting the rocker arm to follow the movement of the force transmitting lever and return toward its first position; means for selectively locking said rocker arm in its second position permitting independent movement of the force transmitting lever; at least one auxiliary frame section connected with the main frame section for movement between an extended, operative position in parallel, end-to-end coplaner relationship with the main frame section, and a retracted, inoperable transport position; and motion transmitting means connected with said auxiliary frame section and selectively engageable with said power means, said motion transmitting means being operable, when engaged with said power means, to actuate the auxiliary frame section between its extended and retracted positions upon operation of said power means.

6. An implement including: a frame for supporting a plurality of earthworking tools; a rockshaft journalled on said frame; a ground support member secured to said rockshaft for movement relative to said frame upon rotation of said rockshaft between transport and working positions to respectively raise and lower the frame relative to the ground; a rocker arm secured to the rockshaft and movable between a first position when said ground support member is in its extreme working position to place the frame in its lowermost position relative to the ground, and a second position to raise the frame to its maximum height above the ground; a force transmitting lever mounted on said frame for pivotal movement in the plane of said rocker arm; extensible and retractable power means mounted between the frame and said force transmitting lever operable upon extension thereof to pivot the force transmitting lever into engagement with the rocker arm to move the rocker arm from its first toward its second position, and operable upon retraction to pivot the force transmitting lever in the opposite direction permitting the rocker arm to follow the movement of the force transmitting lever and return towards its first position; an auxiliary frame section mounted on said frame for movement relative to said frame between an extended operative position and a retracted transport position; a pulley carried by said force transmitting lever; and a flexible lifting cable having one end connected with the auxiliary section and its other end connected with said frame, said cable being engageable with said pulley when the power means is retracted, and subsequent extension of the power means acting through said cable to move the auxiliary section from its extended to retracted position.

7. An implement as defined in claim 6 further including auxiliary ground support means pivotally mounted on the auxiliary section for movement relative to the auxiliary section between transport and working positions to respectively raise and lower the auxiliary section relative to the ground, a crank arm extending from said auxiliary ground support means for actuating the auxiliary ground support means between its transport and working positions, and a second flexible cable having one end secured to said crank arm and its other end secured to said rocker arm operable to maintain the height of the auxiliary section with respect to the ground the same as the height of the frame relative to the ground when the auxiliary section is in its extended operative position.

8. An implement as defined in claim 7 further including hook means on said frame for supporting said lifting cable intermediate its ends for storage when removed from the pulley carried by the force transmitting lever.

9. An implement as defined in claim 7 further including a spring loaded latch member mounted on said frame for movement between locking and release positions and biased to the locking position, said latch member being engageable with said auxiliary section as its moves to its retracted, transport position to lock said auxiliary section in its transport position, a latch release lever pivotally mounted on said frame, and means connecting said latch release lever with said latch member for selectively actuating the latch member from its locking to release position.

References Cited

UNITED STATES PATENTS

| | | | |
|---|---|---|---|
| 2,828,680 | 4/1958 | Johnson | 172—310 |
| 2,939,539 | 6/1960 | Kramer | 172—413 X |
| 2,952,472 | 9/1960 | McNeill | 172—456 X |
| 2,960,346 | 11/1960 | Hunter | 172—502 X |
| 3,003,789 | 10/1961 | Calkins | 172—456 X |
| 3,072,200 | 1/1963 | Yerkes | 172—126 |

ABRAHAM G. STONE, *Primary Examiner.*

T. GRAHAM CRAVER, *Examiner.*

J. R. OAKS, *Assistant Examiner.*